I. SKJELDRUP.
PUSH RAKE.
APPLICATION FILED JUNE 27, 1910.
979,346. Patented Dec. 20, 1910.
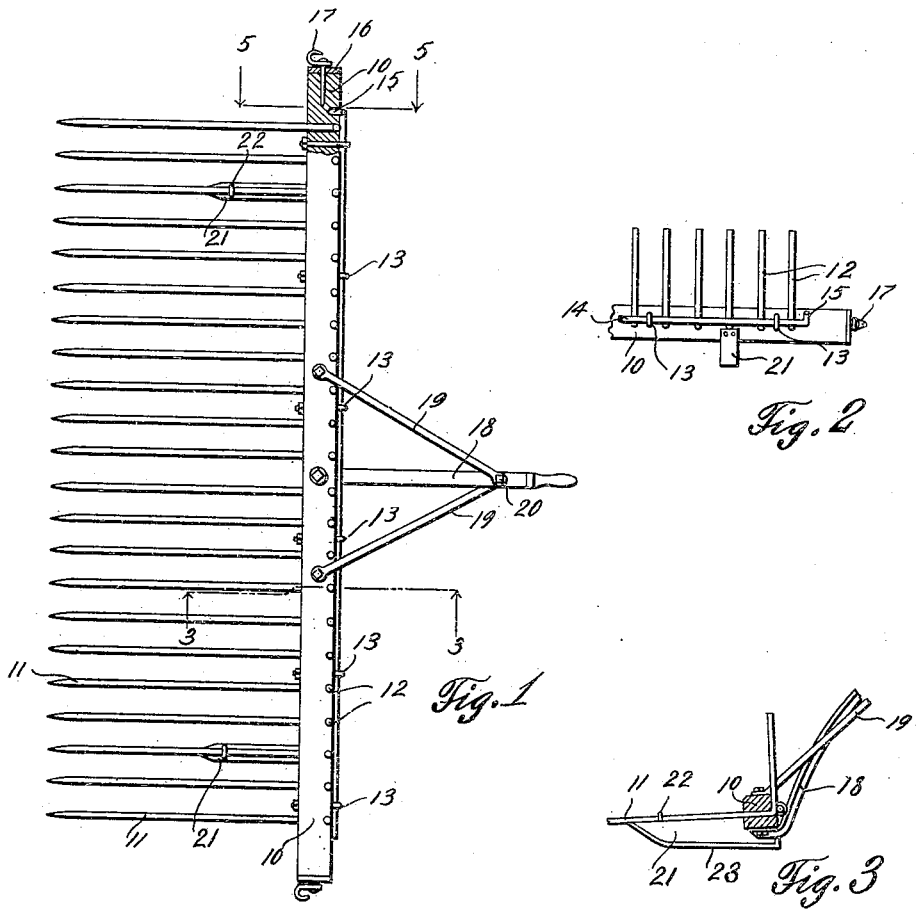
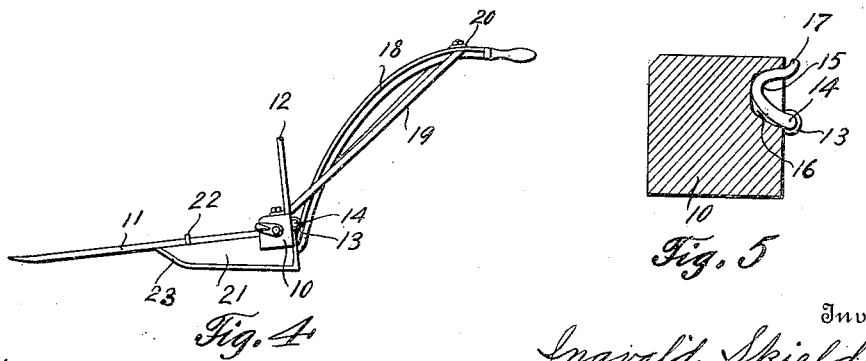
Witnesses
Inventor
Ingvald Skjeldrup
By
Attorneys

UNITED STATES PATENT OFFICE.

INGVALD SKJELDRUP, OF FERGUS FALLS, MINNESOTA.

PUSH-RAKE.

979,346.   Specification of Letters Patent.   Patented Dec. 20, 1910.

Application filed June 27, 1910. Serial No. 569,213.

*To all whom it may concern:*

Be it known that I, INGVALD SKJELDRUP, a subject of the King of Norway, residing at Fergus Falls, in the county of Ottertail and State of Minnesota, have invented certain new and useful Improvements in Push-Rakes, of which the following is a specification.

This invention relates to push rakes, and is designed particularly to constitute a device of this nature which will be simple, durable, and inexpensive to construct. It also contemplates the provision of a means whereby the tines may be retained in their operative position, and whereby any one of said tines may be removed independently of the remaining tines.

With the above and other objects in view, this invention consists in the construction, combination, and arrangement of parts, all as hereinafter more fully described, claimed, and illustrated in the accompanying drawings, wherein—

Figure 1 is a top plan view of a rake constructed in accordance with the present invention, parts thereof being broken away; Fig. 2 is a fragmentary rear elevation of one end of the rake; Fig. 3 is a transverse section taken along the line 3—3 of Fig. 1; Fig. 4 is an end elevation; Fig. 5 is a transverse section taken along the line 5—5 of Fig. 1, illustrating the lock whereby the tines are retained in their operative position.

In carrying out the present invention a main beam 10 is provided having a plurality of transverse openings formed therein. The tines 11 are mounted horizontally in the transverse openings and have the rear terminals 12 thereof bent upwardly to form retaining members which prevent the hay or grass being collected from passing over the beam 10. In order to retain the tines in their operative positions when the rake is in use a plurality of eyes 13 are located on the rear face of the beam 10 at regular intervals between the upwardly projecting terminals 12 of the tines 11 and have reciprocatingly mounted therein the rod 14 which at one terminal thereof is bent transversely to form the spring U-shaped locking member 15. This transverse spring locking U-shaped member 15 is adapted to be retained in a depression or recess 16 in the extremity of the beam 10 through the instrumentality of its own resiliency, and is adapted to be removed therefrom by the finger piece 17 formed at the terminal thereof, thereby permitting the rod 14 to reciprocate in the eyes 13, and releasing the tines 11 for removal. At each terminal of the beam 10 is located a protecting plate 16 on which is mounted the hook 17 which provides a means for moving the rake. An upwardly curved handle 18 is secured to the under side of the beam 10 and has secured thereto the braces 19. One of said braces is secured to the top of the beam 10 on each side of the connection of the handle 18 therewith and extends outwardly to the handle where they are securely fastened by the bolt 20, one over and one below said handle. A runner 21 is secured to a portion of said tines by the strap 22 and has the main beam 10 mounted therein, said runner being provided with a metal shoe 23.

Having thus fully described my invention, what is claimed as new is:

1. In a device of the class described, the combination with a main beam, of a plurality of tines supported horizontally thereby, vertical retaining members formed from said tines, runners carried by a portion of said tines and said main beam, a handle centrally carried by said beam, and means whereby said tines are retained in said beam said means permitting any one thereof to be independently removed.

2. In a device of the class described, the combination with a main supporting beam, of tines extending therethrough, having their rear terminals bent vertically, a plurality of eyes carried in spaced relation by said beam, and a locking rod adapted to reciprocate in said eyes and retain said tines in said beam.

3. In a device of the class described, the combination with a main supporting beam, of tines extending therethrough, having their terminals bent vertically, a plurality of eyes carried in spaced relation by said beam, a locking rod adapted to reciprocate in said eyes and retain said tines in said beam, and means whereby said rod is self-locking.

4. In a device of the class described, the combination with a main supporting beam, of tines extending therethrough, having their terminals bent vertically, a plurality of eyes carried in spaced relation by said beam, a locking rod adapted to reciprocate in said eyes and retain said tines in said beam, and a spring locking member carried at one terminal of said rod adapted to engage said beam and lock said rod in position.

In testimony whereof I affix my signature in presence of two witnesses.

INGVALD SKJELDRUP.

Witnesses:
S. O. TUVE,
L. E. KLEPPE.